Dec. 21, 1965
F. L. CALHOUN
3,225,191
INFRARED LIQUID LEVEL INSPECTION SYSTEM
Filed June 1, 1962
2 Sheets-Sheet 1
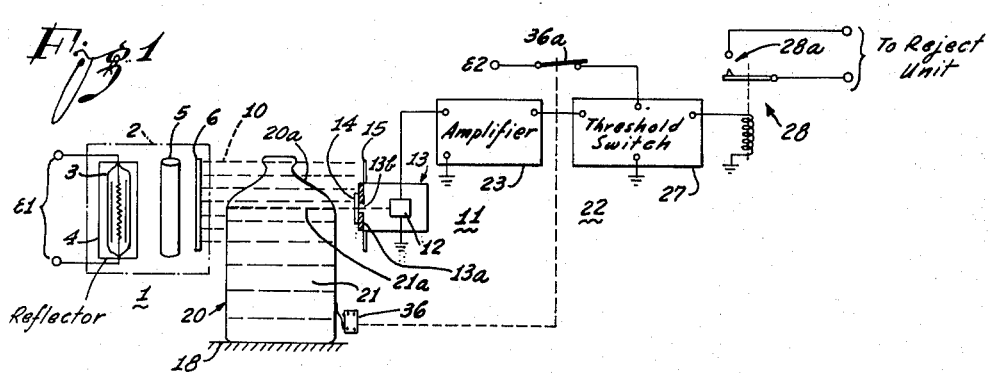
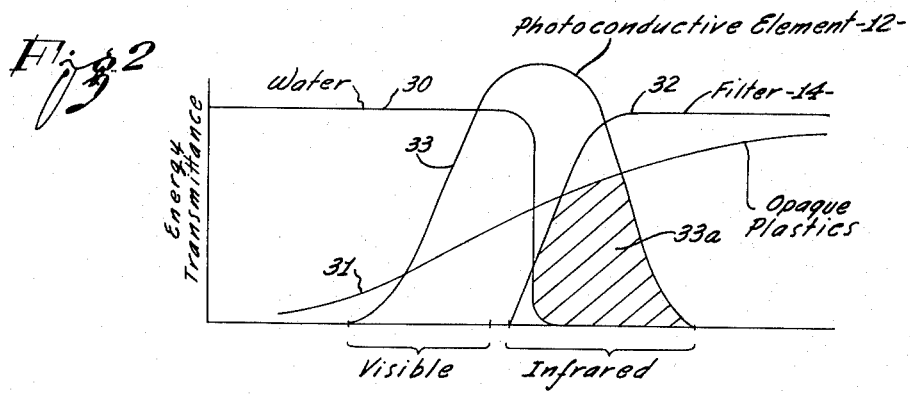
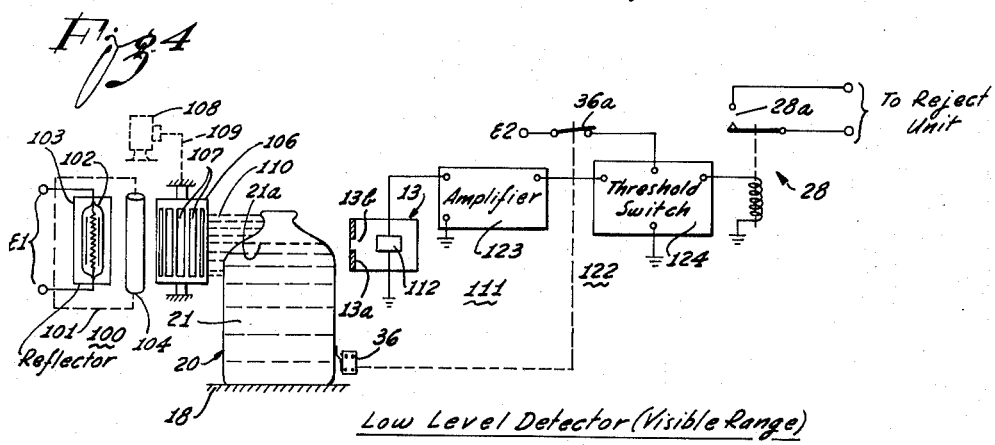
INVENTOR:
Fredrick L. Calhoun
Attorneys

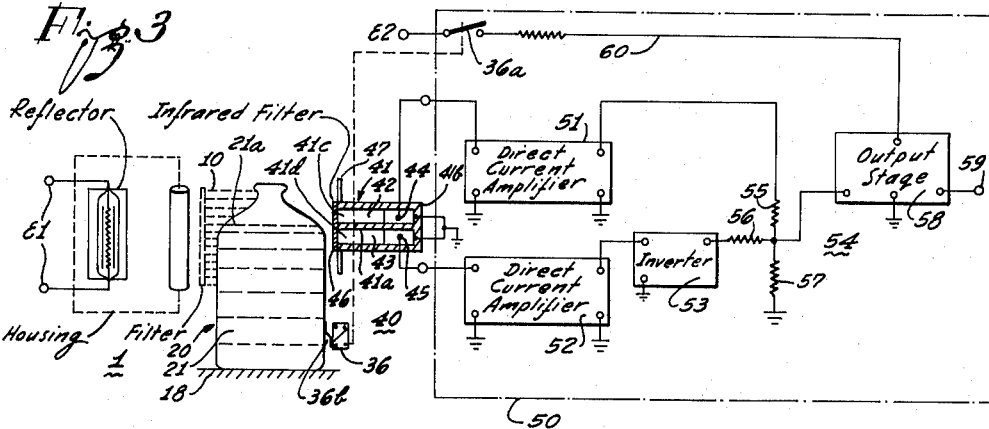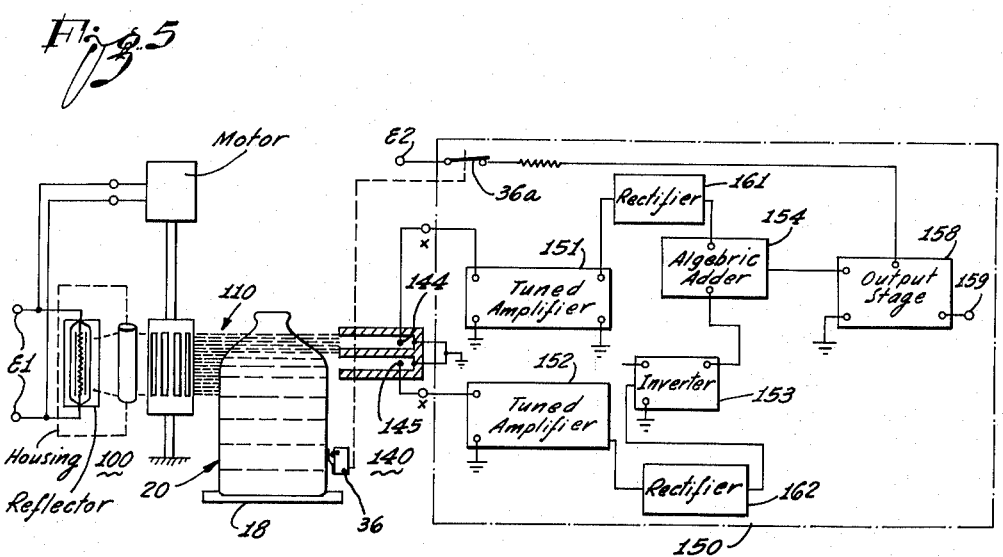

United States Patent Office 3,225,191
Patented Dec. 21, 1965

3,225,191
INFRARED LIQUID LEVEL INSPECTION SYSTEM
Fredrick L. Calhoun, Torrance, Calif., assignor to Industrial Dynamics Company, Ltd., Los Angeles, Calif., a corporation of California
Filed June 1, 1962, Ser. No. 199,382
17 Claims. (Cl. 250—43.5)

A liquid level inspection method and system in accordance with the invention described below utilizes radiant signal energy transmitted through a container to provide a rapid, reliable, and accurate indication of the fill state of the container with reference to a desired level. As a result of the use of infrared energy in the embodiments of this invention, liquid level inspection may be effected through container walls made of plastic or other materials which effectively are opaque with respect to visible radiation. The liquid level inspection method and system of this invention is characterized further by virtual insensitivity to ambient or spurious radiation.

It is understood in the art that the radiation transmitted through a body of given material is equal to the incident radiation less the amounts of incident radiation absorbed into and reflected from the body. The ratio of the amount transmitted to the total amount of radiation incident on the body usually is called the transmittance of the material. In the following description and claims, the phrase effectively transparent will be used to characterize materials having transmittances high enough to pass a quantity of signal radiation useful for purposes of liquid level detection, and the phrase effectively opaque will be used to characterize materials having zero transmittances, or transmittances so low that the quantity of signal radiation transmitted is unusable for purposes of liquid level detection.

The need for a method and apparatus for inspecting automatically and rapidly the state of liquid level in small, closed, and opaque containers has existed for many years. This need has been acute in the packaging industry where inspection must be performed after the containers are filled and capped with high speed automatic machinery.

The need for equipment capable of inspecting liquid level in products packaged for sale in small, closed, and opaque containers is intensified by state and federal regulations and industry-wide codes of good business practice which require quantity labelling and conformance between the stated quantity and actual content.

Other factors that have intensified the problem of liquid level inspection are the increasing use of colorful but opaque containers having small openings, and the increasing speed of filling and capping apparatus. These factors alone preclude the use of visual inspection, and make it mandatory that automatic techniques be used. Furthermore, these circumstances make it difficult, if not impossible, to adapt known liquid level measuring techniques to the task of obtaining automatic, reliable, accurate, and high speed indications of the liquid level in containers of this type.

Among the known varieties of apparatus for measuring liquid level in closed containers are those which translate up or down movement of a float into a signal representing liquid level; those which respond to the difference in the dielectric constant between the liquid and the gaseous content of the space above the liquid, and require that capacitor plates be present within the container; those which rely upon the difference between the thermal conductivity of the liquid and the gases in the space above, and require that a heat sensitive element like a thermistor be mounted inside the container; those which are based upon the difference in echo time of an ultrasonic sound wave reflected from the surface of the liquid and a reference point, and require the presence of a stillwell, a source of ultrasonic energy, and an ultrasonic sensor within the container; and those predicated upon the pressure head of the liquid to obtain a measurement of liquid level, and which require that a pressure-sensing device be installed within the container.

Other known techniques for measuring or detecting liquid level within closed containers do not require the presence of a detector within the container. Among these techniques are those which detect change in weight as liquid level changes, and those which rely upon a change in a characteristic of radiant energy transmitted through the container walls. Although each of the aforementioned conventional techniques are applicable in resolving many liquid level-measuring and detecting problems, only the technique utilizing radiant energy is practical for use in situations where the container has a small opening, is opaque, and the inspection must be accomplished at the operating rate of modern, high-speed filling and sealing machines. The techniques based on weighing the container, for example, are unsatisfactory principally on account of the response time of the weighing mechanisms. And the techniques, which require the presence of sensing elements inside the container are impractical, not only because of the time required for their introduction and extraction, but also because the inspection of liquid level ordinarily must be accomplished after the container has been capped.

Prior to the invention described below, the level-detecting technique utilizing radiant energy directed through the container from an outside source was limited to use with containers having walls effectively transparent to visible radiation. Furthermore, cumbersome shielding was necessary to prevent malfunction of the inspection apparatus as the result of interference by spurious radiation. The inspection apparatus was incapable of discriminating visible signal radiation transmitted through the container from spurious visible radiation from other sources. As a consequence, it was necessary to operate the inspection apparatus in a light-proof housing in order to avoid malfunction resulting from stray radiation. Liquid level detectors embodying this invention utilize a novel method and apparatus for overcoming the aforestated limitations of the prior art.

A first embodiment of this invention includes a beam source of continuous infrared energy, a photosensitive unit disposed in the path of the beam, and means for supporting the container undergoing inspection between the source and the photosensitive cell so that, when the liquid level is at a desired minimum, at least a portion of the meniscus will intercept the beam. To minimize the possibility that spurious infrared radiation may produce an erroneous output signal from the detector, the photosensitive cell is comprised of a photoconductive element selectively responsive to infrared radiation and mounted within a collimating tube or black body housing having a single open end oriented toward the beam source. Furthermore, the opening of the housing is disposed in close proximity to the container wall. An infrared filter may be disposed over the opening to exclude spurious radiation of frequencies, other than infrared, which may be reflected from the surface of the container wall into the photosensitive unit. Additional protection against the reflection of spurious radiation may be provided by a shield mounted around the opening. With the foregoing structure, the possibility that stray radiation of infrared or other frequencies will produce false output signals is minimized, if not wholly eliminated. Thus, in one operation of the first embodiment, if the liquid level in the container undergoing inspection is below the correct level, enough infrared energy passes through the container walls and into the photosensitive cell to develop an electrical output signal. On the other hand, if the liquid level is at or above the correct level, the beam of infrared energy effectively is attenuated by the liquid sufficiently to render the output signal, if any, inconsequential. An output circuit including one or more amplifiers is coupled to the photosensitive unit to prepare the output signal for use in controlling the operation of an appropriate utilization circuit.

The second embodiment of this invention senses the existence of a correct liquid level in the container, and discriminates between the correct, overfilled and underfilled levels. The second embodiment is like the first embodiment in all essential respects except that the photosensitive unit of the second embodiment comprises first and second photoconductive elements selectively responsive to infrared energy, and in vertically spaced-apart relation. An output circuit includes a first channel coupled to the first photoconductive element and a second channel coupled to the second element. In this embodiment, the photosensitive unit is mounted so that the space between the first and second photoconductive elements is in a plane common to the beam source and at least a portion of the meniscus when the liquid is at the correct level. With this modified photosensitive unit, only the upper photoconductive element receives infrared energy when the liquid is at the correct level. When the liquid is below the correct level, both photoconductive elements receive beam energy, and when the liquid is above the correct level, neither element receives enough beam energy to be of consequence. Thus, the existence of the correct liquid level is signified by the presence of an effective output signal from the upper element and the absence of an effective signal output from the lower element.

The respective output signals from the photosensitive units of the first and second embodiments may be utilized as desired. For example, after the output signals are amplified sufficiently in the output circuits, they may be utilized to close a threshold switch and thereby energize a relay control circuit. The relay, in turn, may actuate a rejection mechanism and dislodge an inadequately filled container from a conveyor, turn off filling equipment, energize signal devices, or control other apparatus as may be appropriate. Moreover, through use of the novel output circuit described more fully below in conjunction with the second and fourth embodiments, the liquid level detector of this invention may reject selectively underfilled and overfilled containers.

A third embodiment in accordance with this invention is capable of detecting the existence of at least a desired minimum liquid level within the container. This embodiment is somewhat similar to the first embodiment except that the beam of radiant energy is modulated. The modulated beam of radiant energy may comprise a source of radiant energy of any type which would be attenuated differently by the filled and empty portions of the container, and a light chopper interposed between the source and the container. If the third embodiment is to be capable of detecting the liquid level within containers which are opaque to radiant energy of visible wave length, an infrared source should be used. A fourth embodiment of this invention is similar to the second embodiment except that it includes a source of modulated radiant energy similar to the source which is included in the third embodiment.

From the foregoing paragraphs, it should be apparent that this invention provides a novel method and system for inspecting automatically, rapidly, reliably, and accurately the fill state of closed containers having walls which are transparent or effectively opaque to radiant energy of visible frequency. This means, in effect, that the container materials may be made from plastics like polystyrene, polyethylene or polypropylene which may be opaque, translucent, or transparent with respect to radiant energy having wave lengths other than infrared of about 1.6 microns or higher. With respect to infrared radiation, however, the container walls should be effectively transparent.

Water, on the other hand, and most liquids have a relatively low spectral transmittance for radiant energy of infrared frequency. Hence, a much larger amount of infrared radiation will be absorbed by the liquid than by the container walls. As a consequence, a much larger percentage of the incident radiant energy is transmitted through the empty portion of the container than through the filled portion.

In the drawings:

FIGURE 1 represents diagrammatically a first embodiment utilizing a continuous beam of infrared energy to detect whether a liquid has been filled to a proper level in a container;

FIGURE 2 represents a graphically the respective transmittances of a typical liquid, container wall, and infrared filter and the conductivity of typical photoconductors, as functions of radiant energy wavelength;

FIGURE 3 represents diagrammatically a second embodiment of this invention where a continuous beam of infrared energy is utilized to sense the correct fill state of a container undergoing inspection;

FIGURE 4 represents diagrammatically a third embodiment of this invention wherein a modulated beam of radiant energy is utilized to detect whether a container has been filled to a proper level; and FIGURE 5 represents diagrammatically a fourth embodiment of this invention utilizing a modulated beam of radiant energy to detect the correct fill state of a container undergoing inspection.

In general, the embodiment of FIGURE 1 comprises a source 1 of a continuous beam 10 of infrared energy, a photosensitive unit 11 disposed in the path of a beam 10 in spaced-apart relation with respect to the infrared source 1, a support 18 for a container 20 undergoing inspection, and an output circuit 22 including an amplifier 23 and a threshold switch 27. The threshold switch 27 may be coupled to any appropriate form of utilization circuit. For example, a utilization circuit responsive to operation of the threshold switch 27 may be comprised of a relay 28 for controlling the operation of a container reject unit (not shown) through relay contacts 28a.

The source 1 of the continuous infrared beam 10 includes a housing 2 containing an infrared lamp 3 energized from a source of electrical power (not shown) coupled to terminals E1. The source 1 also includes a reflector 4 preferably having a parabolic cross-section in the horizontal plane for directing infrared energy from lamp 3 into a beam having an elongated cross-section oriented vertically. The source 1 further includes a cylindrical lens 5 disposed vertically at the focal point of reflector 4. The cylindrical lens 5 collimates the radiant energy into a thin beam 10 having an elongated cross-section oriented in a direction generally perpendicular to the plane of the meniscus 21a formed by the liquid 21 in container 20. Where the lamp 3 is an ordinary incandescent source of radiant energy, the beam source 1 also may include an infrared filter 6.

The photosensitive unit 11 includes a photoconductive element 12 which is conductive in the range of infrared energy. The element is disposed within a housing or collimating tube 13 having one end 13a relatively close to the remote wall 20a of the container 20. The end 13a of the collimating tube 13 is provided with a small opening 13b to permit radiant energy, if any, transmitted through the container 20 to reach the photoconductive element 12. The opening 13b and the photoconductive element 12 are disposed in collinear relation on a line generally parallel to the axis of beam 10.

A filter 14 may be disposed over opening 13b of the collimating tube 13 and may be provided with characteristics to pass energy at the upper end of the infrared band of frequencies. The filter 14 is effective in at least partially preventing spurious energy from affecting the operation of the photoconductive element 12. A shield 15 may also be disposed around the end 13a of collimating tube 13 to provide a further safeguard against the entry of spurious infrared radiation into the opening 13b. If desired, the shield 15 may be made of a resilient material, and may have a cup-like configuration which will result in a closely adjacent, if not contiguous, relationship between its edges and the remote wall 20a of container 20.

As depicted in FIGURE 1, the container 20 undergoing inspection is filled with any liquid 21 which is effectively opaque to infrared radiation. Inasmuch as the liquid 21 fills container 20 to the desired level, the liquid at the meniscus 21a obstructs enough of the infrared energy of beam 10 to produce at least a detectable change in the conductivity of photoconductive element 12.

It is unnecessary that the walls of container 20 be effectively transparent with respect to visible radiant energy. However, the container walls must be effectively transparent with respect to radiant energy of infrared wavelength. These requirements are satisfied by various plastics and many other materials. Furthermore, water and many other liquids are effectively opaque to infrared radiation.

The change in conductivity of the photoconductive element 12 resulting from the obstruction by liquid 21 of a significant amount of radiant energy of beam 10 is amplified in direct-current amplifier 23 sufficiently to close the normally-open threshold switch 27. When this occurs, the relay 28 is energized, and the relay contacts 28a are actuated to control the utilization circuit (not shown). Inasmuch as the amplifier 23 and the threshold switch 27 may be any one of several well known circuits a detailed description of their structure and operation is omitted. The direct-current amplifier 23, for example, may comprise one or more amplifying stages in cascade, and the threshold switch 27 may comprise a grid-controlled thyratron.

The curves of FIGURE 2 are helpful in explaining how the liquid-level inspection system of FIGURE 1 is rendered responsive selectively to a narrow band of infrared frequencies. The characteristic of transmittance versus wavelength for a typical liquid 21 such as water in container 20 is represented by curve 30; the characteristic of transmittance versus wavelength for the walls 20a of container 20 is represented by curve 31; and the characteristic of transmittance versus wavelength for the filter 14 of photosensitive unit 11 is represented by the curve 32. The variation in conductivity of photoconductive element 12 with wavelength is represented by the curve 33. It should be noticed that the transmittance 30 of the liquid remains relatively constant through the range of ultraviolet wavelengths and then begins diminishing rapidly toward zero at the low end of the infrared range. On the other hand, the transmittance 32 of the filter 14 and of the photosensitive unit 11 increases rapidly toward a maximum in the upper half of the infrared frequency band. The conductivity 33 of the photoconductive element 12 is at a maximum in the infrared frequency band and has a descending segment 33a which overlaps a comparatively narrow portion of the infrared spectra transmitted through the filter 14. Accordingly, only the infrared energy having wavelengths within the shaded area 34 of FIGURE 2 passes through the empty portion of the container 20 and affects the conductivity of the photoconductive element 12. This feature alone effectively screens out most of the spurious radiant energy in the vicinity of the photosensitive unit 11. As described above, the shield 15 may be used to eliminate any spurious radiant energy which otherwise would enter the opening 13b of the collimating tube 13 and produce an erroneous response of the photoconductive element 12.

The operation of the embodiment of the liquid-level inspection system represented in FIGURE 1 involves the placement of container 20 on support 18 so that at least a portion of the beam 10 will be intercepted by the meniscus 21a of the liquid 21 when the latter is at the desired minimum level. If, in fact, the filled state of container 20 is equal to or above the desired level, the infrared energy of beam 10 at least will be attenuated sharply with respect to infrared energy transmitted through the empty portion of container 20. Accordingly, less infrared energy within the narrow band of wavelengths represented in FIGURE 2 by the shaded area 34 will be transmitted to the photoconductive element 12. The resulting reduction in the conductivity of the photoconductive element 12 will diminish the input voltage to the direct current amplifier 23, and the ensuing change in the output signal of amplifier 23 will cause the threshold switch 27 and actuate relay 28 to control an appropriate utilization circuit (not shown). As explained above, the utilization circuit may be an electromechanical device for removing the container 20 from a conveyor, or for actuating a signal device, or other appropriate apparatus.

Each time a container 20 is positioned on support 18 a microswitch 36 is actuated to condition the output circuit 22 for an inspection. For example, where the threshold switch 27 is a grid-controlled thyratron, the operation of microswitch 36 by the positioning of a container 20 on support 18 may apply plate voltage from terminal E2 via switch contacts 36a to the thyratron. This event effectively primes the output circuit 22 for response to any change in the conductivity of the photoconductive element 12 of photosensitive unit 11. Likewise, removal of a container 20 from support 18 would have the effect of deactuating the microswitch 36 to remove plate voltage from the thyratron. Hence, the thyratron will cease to conduct, its gas will deionize, and the threshold switch 27 is reopened in preparation for another cycle of operation.

It will be appreciated that the filter 14 does not have to be included under certain circumstances. For example, when the container 20 constitutes an opaque bottle, the bottle itself acts as a filter to prevent the passage of energy in the visible range of frequencies and in the frequencies below the visible range and in the lower end of the infrared range of frequencies. Furthermore, if the liquid in the container 20 contains a relatively high percentage of water, the absorption characteristics of the water plus the filtering action of the cell will provide a sufficient change in the output signal to indicate the proper level of the liquid in the container.

It will also be appreciated that the embodiment of FIGURE 1 may be used to detect an underfill condition instead of an overfill condition. When an underfill condition is being detected, the photoconductive member 14 produces a signal of high amplitude upon the occurrence of an underfilled state in the container 20 and produces a signal of low amplitude upon the occurrence of a liquid level in the container at least equal to a particular value. Of course, the vertical position of the photoconductive member 12 may have to be adjusted slightly downwardly for a detection of an underfilled state in comparison to the position of the member 12 when an overfilled state is being detected.

A second embodiment of the liquid level inspection system, represented in FIGURE 3, operates to detect the existence or non-existence of a correct fill state of a container. In the embodiment of FIGURE 3, the source 1 of infrared signal energy, the container 20, and the container base 18 are essentially the same as those described above for the embodiment of FIGURE 1. The second embodiment further includes a novel photosensitive unit 40 and an output circuit 50. The novel photosensitive unit 40 includes a housing or collimating tube 41 having its interior divided into upper and lower compartments 42 and 43, respectively, by a thin flat partition 41a extending longitudinally from the rear wall 41b to the front end. In this manner, two openings 41c and 41d are formed in the front end for admitting the radiant energy which may pass through container 20 to the interior of the collimating tube 41. A first photoconductive element 44 is disposed within upper compartment 42 and a second photoconductive element 45 is disposed in lower compartment 43. The first and second photoconductive elements 44 and 45 have effectively equal characteristics of conductivity versus wavelength such as represented by curve 33 of FIGURE 2.

The openings 41c and 41d of collimating tube 41 may be covered wtih an infrared filter 46 which has a characteristic of transmittance versus wavelength such as represented by curve 32 of FIGURE 2. In addition, a shield 47 corresponding to the shield 15 of FIGURE 1 may be secured in position around the openings 41c and 41d in order to minimize the possibility that spurious radiation of infrared wavelength may enter photosensitive unit 40. The infrared filter 46 and the shield 47 effectively eliminate the possibility that spurious radiant energy will enter the photosensitive unit 40 and cause a malfunction of the inspection system.

In the embodiment of FIGURE 3, the interrelationship between the beam 10 of infrared signal energy, the photosensitive unit 40 and a container 20 filled to the correct level are arranged so that the meniscus 21a of the liquid 21 within container 20 lies in a plane containing the partition 41a of the photosensitive unit 40 and an axis of beam 10. Furthermore, the container 20 is positioned so that the vertical axis through the container will lie in the plane of the beam 10. The comparatively wide vertical dimension of beam 10 makes it possible to make the adjustments required to achieve the aforedescribed interrelationship between the meniscus 21a and the partition 41a of the photosensitive unit 40 without raising or lowering the source 1 of infrared radiant energy. As a matter of fact, the required interrelationship can be established in most cases merely by raising or lowering the photosensitive unit 40 until partition 41a lies in the plane containing the meniscus 21a when the container 20 is filled to the correct level.

When the aforedescribed relationship exists, the infrared signal energy of beam 10 passing through the walls of container 20 above the meniscus 21a is attenuated less than the infrared signal energy of beam 10 intercepting the container 20 below the meniscus 21a. As a result, the infrared signal energy entering the upper opening 41c and falling on the photosensitive unit of the first photoconductive element 44 is substantially greater than the energy, if any, passing through the lower opening 41d and falling on the second photoconductive element 45. Thus, when the meniscus 21a is at the correct liquid level, the electrical output signal of the first photoconductive element 44 is maximized, and the electrical output signal of the second photoconductive element 45 is minimized.

When the container 20 is underfilled, the infrared signal energy of beam 10 arriving at the first and second photoconductive elements 44 and 45 is attenuated only by the walls. Hence, the electrical output signal of the second photoconductive element 45 is increased, and may become effectively equal to the electrical output signal from the first photoconductive element 44. On the other hand, when the container 20 is overfilled, the liquid 21 attenuates infrared radiant energy to both the first and second photoconductive elements 44 and 45. This has the effect of rendering both electrical output signals, if any, effectively equal.

The output circuit 50 represented in FIGURE 3 includes means for controlling a utilization device (not shown) in response to the existence of a maximum difference in the respective magnitudes of the electrical output signal from the first and second photoconductive elements 44 and 45. From the foregoing text, it should be apparent that the difference in the electrical output signals from the photosensitive unit 40 will be maximized when the liquid 21 in the container 20 is at the correct level. The construction of a suitable embodiment of the output circuit 50 is disclosed in detail and claimed in copending application Serial No. 37,471, now Pat. No. 3,133,638, filed June 20, 1960 by me.

In general, the output circuit 50 may include a first direct-current amplifier 51 coupled to the first photoconductive element 44 and a second direct-current amplifier 52 coupled to the second photoconductive element 45 of the photosensitive unit 40. The amplifiers 51 and 52 may have a construction similar to that of the amplifier 23 in FIGURE 1. The output circuit 50 may also include an inverter 53 coupled to the output terminal of the second direct-current amplifier 52 and may further include an algebraic adder network 54 coupled, respectively, to the output terminals of the first direct-current amplifier 51 and the inverter 53. In this way, the network 54 produces an electrical difference signal having a magnitude proportional to the difference in magnitudes between the electrical signal outputs from the first and second photoconductive elements 44 and 45.

An output stage 58 is coupled to the output terminal of the algebraic adder network 54 to become operative in accordance with relatively great differences in the outputs of the amplifiers 51 and 52. The output stage 58 may be a flip-flop which is triggered to a first state of operation by the introduction of a signal on a line 59 every time that a different container 20 is moved to the test position. When the liquid in the container 20 is at the proper level, the signal from the amplifier 51 and the inverter 53 are both high so that a signal of large amplitude is produced at the output terminal of the network 54. This signal triggers the flip-flop 58 to the second state of operation to indicate that the liquid in the container is at the proper level. In this way, the flip-flop becomes triggered to the second state only upon the occurrence of an acceptable container. The output signal from the flip-flop is produced at a terminal 60 which may be obtained from either of the two stages in the flip-flop.

Inasmuch as the inverter 53 and the adder network 54 may comprise any one of a number of conventional and well known circuits, it is deemed unnecessary to describe their circuitry in detail. For example, the inverter 53 may be a grid-controlled, space-discharge device biased in a well known manner to reverse the polarity of the output signal from the direct current amplifier 52 without changing its magnitude. The algebraic adder network 54 may include resistors 55 and 56 coupled in series between the output terminals of the first direct current amplifier 51 and the inverter 53 and may further include a resistor 57 coupled between the common terminal of the resistors 55 and 56 and a ground source of constant potential. By providing this arrangement for the network, the resistor 57 receives relatively high potentials from the amplifier 51 and the inverter 53 only when the liquid in the container 20 is at the proper level. The flip-flop in the output 58 is biased to become triggered to its second state of operation only upon the occurrence of the relatively high potential across the resistor 57.

The third embodiment of this invention represented in FIGURE 4, like the embodiment of FIGURE 1, can be used to determine whether the liquid level in a container is at least equal to a desired minimum level. As an alternative, the embodiment of FIGURE 4 can be used to determine whether the level of liquid is greater than the desired level. In the third embodiment, however, virtual immunity to the effects of spurious radiant energy is obtained through the use of a source of modulated radiant energy and an output circuit containing narrow bandpass amplifiers tuned to the modulation frequency of the beam. This novel innovation obviates the need for an infrared filter and protective shield to eliminate the deleterious effects of spurious radiant energy.

In general, the third embodiment includes a source 100 of radiant energy in a modulated beam 110, a container support 18, a photosensitive unit 111 and an output circuit 122. The source 100 of the modulated radiant-energy beam 110 comprises a housing 101 containing a radiant-energy lamp 102 energized from a source (not shown) of electrical power coupled to terminals E1, a reflector 103 for directing the radiant energy from lamp 102 into a beam of elongated cross-section and a cylindrical lens 104 for collimating the radiant energy into a thin, vertically-elongated beam 110. The source 100 further includes a beam modulator formed from an empty cylinder 106 disposed in the path of beam 110 and mounted for rotation around a vertical axis. The cylinder 106 is provided with pairs of diametrically-opposite, vertically-elongated openings 107 spaced apart at equal intervals in the cylinder wall. The cylinder 106 is rotated at a constant speed by a motor 108 which is energized via terminals E1 and which is coupled mechanically to the cylinder 106 via the shaft 109.

It should be noticed that the source of radiant energy may be designed to generate a thin beam of round cross-section in lieu of the beam 110 of elongated cross-section emitted by the source 100 of FIGURE 4. Moreover, the beam modulator formed by the cylinder 106 may be omitted entirely, and the radiant energy lamp 102 may be energized intermittently at a predetermined frequency in order to generate the modulated beam 110 of radiant energy.

The positioned interrelationship of the radiant energy beam 110, container 20, and the photosensitive unit 111 is established so that collimated rays of the beam 110, at least a portion of the meniscus 21a, and the photoconductive element 112 of the photosensitive unit 111 are in coplanar relation when the liquid in container 20 is at the correct level. This interrelationship can be established in the embodiment of FIGURE 4 in the same manner described above in connection with the embodiment of FIGURE 1. For reasons set forth above, it is also desirable to have the beam 110 intersect the vertical axis of container 20.

The photosensitive unit 111 is like the unit 11 described above in connection with FIGURE 1. The principal difference between the two is that the photosensitive unit 111 does not require the shield 15 and infrared filter 14 to provide a protection against spurious radiant energy. The use of a modulated radiant energy beam 110 makes it possible to provide an output circuit 122 which discriminates between the modulated and other ("noise") components in the electrical output signal from the photoconductive element 112. The output circuit 122 may include an amplifier 123 tuned to the modulation frequency of the beam 110 and having narrow bandpass characteristics. The output from the amplifier 123 controls the operation of a threshold switch 124 corresponding to the switch 27 in FIGURE 1.

A fourth and preferred embodiment of this invention is represented in FIGURE 5. A liquid-level inspection system in accordance with this embodiment can sense the existence of a correct liquid level in a container undergoing inspection. In addition, this embodiment is like the embodiment of FIGURE 4 in that it is virtually immune to the effects of spurious radiant energy.

The embodiment of FIGURE 5 generally comprises a source 100 of a vertically-elongated, intensity-modulated, radiant-energy beam 110, a container support 18, and a photosensitive unit 140. The source 100 is constructed in a manner similar to that described previously and illustrated in FIGURE 4 and the photosensitive unit 14 is constructed in a manner similar to the photosensitive unit 40 in FIGURE 3. The principal difference between the photosensitive units 40 of FIGURE 3 and the unit 140 of FIGURE 5 is that the latter does not require the infrared filter 46 and the shield 47 in order to minimize the deleterious effects of spurious radiant energy. The fourth embodiment illustrated in FIGURE 5, like the embodiment of FIGURE 4, resolves this problem through the use of an intensity-modulated beam, and through the use of amplifiers in the output circuit tuned to the modulation frequency.

The output circuit 150 coupled to the photosensitive unit 140 at terminals X—X functions generally in the same manner as output circuit 50 described above in connection with FIGURE 3 to produce a correct-level output signal at the output terminal 159 whenever the liquid level in container 20 is correct. The principal difference between the output circuit 150 and the output circuit 50 of FIGURE 3 is that the components of the former are designed for response to a pulsating input signal from the photosensitive unit 140. Thus, the output circuit 150 generally includes a first tuned amplifier 151 coupled to the first photoconductive element 144 of the photosensitive unit 140 and a second tuned amplifier 152 coupled to the second photoconductive element 145. The signals from the amplifiers 151 and 152 are respectively rectified by stages 161 and 162 which may be constructed in a conventional manner. The output circuit 150 also includes an inverter 153 coupled to the output terminal of the rectifier stage 162 and further includes an algebraic adder network 154 coupled between the respective output terminals of the rectifier stage 161 and the inverter 153. An output stage 158 is coupled to the output terminal of the algebraic adder network 154. The first and second tuned amplifiers 151 and 152 are conventional narrow bandpass amplifiers tuned to the modulation frequency of beam 110. The inverter 153, the adder network 154 and the output stage 158 may correspond in construction and operation to like stages in the embodiment of FIGURE 3.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for indicating a particular level of liquid in a container having characteristics of passing energy in the infrared band of wavelengths where the liquid has properties of blocking the passage of energy at wavelengths in the infrared band and at wavelengths above the infrared band,
    means disposed relative to the container for directing energy in the infrared band toward the container,
    means disposed relative to the container for receiving the energy passing from the container at substantially the particular level and having characteristics for blocking energy in a range of wavelengths below the infrared band and for producing signals in accordance with the occurrence of energy in the infrared band, and
    means responsive to the signals produced by the last mentioned means for indicating whether the liquid is at the particular level in the container.

2. The combination set forth in claim 1 in which the signal-producing means produces a direct signal having a first magnitude upon the occurrence of liquid in the container at the particular level and having a second magnitude different from the first magnitude upon the occurrence of liquid in the container at a level different from the particular level.

3. The combination set forth in claim 1 in which means are disposed relative to the container to convert the energy to an alternating characteristic at a particular frequency and in which the signal-producing means produces an alternating signal having a first amplitude upon the occurrence of liquid in the container at the particular level and having a second amplitude different from the first amplitude upon the occurrence of liquid in the container at a level different from the particular level.

4. In combination for indicating a particular level of liquid in a container having characteristics of passing energy in the infrared band of wavelengths where the liquid has properties of blocking the passage of energy at wavelengths in the infrared band and at wavelengths above the infrared band, means disposed relative to the container for directing energy in the infrared band toward the container, first means disposed at substantially the particular level to receive the energy in the infrared band from the container and having characteristics to block the effect of energy at wavelengths below the infrared band and to produce a signal having first characteristics upon the reception of energy in the infrared band in representation of a level of liquid above the particular value and having second characteristics upon a failure to receive energy in the infrared band in representation of a level of liquid equal to or less than the particular value, second means disposed at substantially the particular level to receive the energy in the infrared band from the container and having characteristics to block the effect of energy at wavelengths below the infrared band and to produce a signal having the first characteristics upon the reception of energy in the infrared band in representation of a level of liquid below the particular value and having the second characteristics upon a failure to receive energy in the infrared band in representation of a level of liquid equal to or greater than the particular value, and output means operatively coupled to the first and second means for combining the signals from the first and second means in a particular relationship to provide an output indication as to the occurrence of the liquid at the particular level.

5. The combination set forth in claim 4 in which means are operative upon the energy to provide the energy with alternating characteristics at the particular frequency and in which the output means are responsive to the signals from the first and second means only at the particular frequency to produce the output signal.

6. In combination for indicating a particular level of liquid in a container having characteristics of passing energy in the infrared band of wavelengths where the liquid has properties of blocking the passage of energy at wavelengths in the infrared band and at wavelengths above the infrared band, means disposed relative to the container for directing energy in the infrared band toward the container, filter means disposed relative to the container for passing energy in the infrared band of frequencies and in wavelengths above the infrared band and for blocking the passage of energy at wavelengths below the infrared band, means disposed relative to the filter means and having characteristics for producing a first signal upon the passage of energy in the infrared band through the filter means and for producing a second signal having characteristics different from the first signal upon a failure of energy in the infrared band to pass through the filter means, and means operatively coupled to the last mentioned means for indicating the occurrence of the particular level of liquid in the container in accordance with the production of the first and second signals.

7. The combination set forth in claim 6 in which the signal-producing means are constructed to block the effect of any passage of energy through the filter means at particular wavelengths below the infrared band and to produce a direct voltage and in which the first signal is a direct voltage of relatively large magnitude and in which the second signal is a direct voltage of relatively low magnitude.

8. In combination for indicating a particular level of liquid in a container having characteristics of passing energy in the infrared band of wavelengths where the liquid has properties of blocking the passage of energy at wavelengths in the infrared band and at wavelengths above the infrared band, means disposed relative to the container for directing energy in the infrared band toward the container, filter means disposed relative to the container for passing energy in the infrared band of wavelengths and in wavelengths above the infrared band and for blocking the passage of energy at wavelengths below the infrared band, first means disposed relative to the filter means at substantially the particular level and having characteristics for producing a direct voltage of large magnitude upon the passage of energy in the infrared band through the filter means and having characteristics for producing a direct voltage of low magnitude upon a failure of energy in the infrared band to pass through the filter means, second means disposed relative to the filter means at substantially the particular level and having characteristics for producing a direct voltage of large magnitude upon the passage of energy in the infrared band through the filter means and having characteristics for producing a direct voltage of low magnitude upon a failure of energy in the infrared band to pass through the filter means, and output means operatively coupled to the first and second means for producing an output signal in accordance with the relative magnitudes of the voltages produced by the first and second means and in representation of the occurrence of the particular level in the container.

9. In combination for indicating a particular level of liquid in a container having characteristics of passing energy in the infrared band of wavelengths where the liquid has properties of blocking the passage of energy at wavelengths in the infrared band and at wavelengths above the infrared band, means disposed relative to the container for directing energy in the infrared band toward the container, means for converting the energy in the infrared band to alternating characteristics at a particular frequency, signal means disposed relative to the container and having characteristics for passing energy substantially only in the infrared band to produce an electrical signal in accordance with the passage of energy in the infrared band from the container, and output means responsive to the electrical signal produced by the signal means at the particular frequency for providing an output indication as to the occurrence of the liquid at the particular level in the container.

10. The combination set forth in claim 9 in which the signal means includes first and second means each disposed to produce respectively first and second electrical signals in accordance with the level of the liquid in the container and each provided with characteristics for passing energy substantially only in the infrared band and in which the output means are connected to the signal means to provide an output indication in accordance with the pattern of signals from the first and second means.

11. A method of indicating a particular level of liquid in a container having characteristics of passing energy in the infrared band of wavelengths where the liquid has properties of blocking the passage of energy at wavelengths in the infrared band and at wavelengths above the infrared band, disposing a detector of infrared energy at substantially the particular level where the detector has characteristics of detecting energy at substantially only wavelengths in the infrared band, directing infrared energy toward the container to obtain a passage of infrared energy from the container in accordance with the level of liquid in the container, and providing an output indication in accordance with the amount of energy detected by the detector.

12. The method set forth in claim 11 wherein alternating energy at a particular frequency is directed toward the container and wherein the output indication is provided in accordance with the passage of the infrared energy at the particular frequency to the detector.

13. The combination set forth in claim 11 wherein first and second detectors are disposed at substantially the particular level and wherein the first and second detectors are provided with characteristics of detecting energy at substantially only wavelengths in the infrared band wherein the output indication is produced in accordance with the relative pattern of infrared energy detected by the first and second detectors.

14. The combination set forth in claim 8 wherein the first and second means have characteristics for responding substantially only to energy in the infrared band.

15. In combination for indicating a particular level of liquid in a container having characteristics of passing energy at a particular frequency where the liquid has properties of blocking the passage of energy at the particular frequency,
 means disposed relative to the container for directing energy at the particular frequency toward the container,
 means disposed relative to the energy-directing means for converting the energy at the particular frequency to alternating characteristics at a second frequency different from the particular frequency,
 means disposed relative to the container for responding to energy passing from the container at substantially only the particular frequency to produce an electrical signal in accordance with the passage of energy at substantially only the particular frequency from the container wherein the electrical signal has a portion modulated at the second frequency,
 amplifier means coupled to the last mentioned means for amplifying only that portion of the electrical signal modulated at the second frequency, and
 output means operatively coupled to the amplifier means and responsive to the electrical signal amplified by the amplifier means for providing an output indication as to the occurrence of the liquid at the particular level in the container.

16. The combination set forth in claim 15 wherein the amplifier means includes an amplifier tuned to the second frequency.

17. The combination set forth in claim 15 wherein the means for passing the energy from the container at only the particular frequency includes a filter having characteristics in accordance with the characteristics of the liquid for passing energy at substantially only the particular frequency.

References Cited by the Examiner
UNITED STATES PATENTS

| | | | |
|---|---|---|---|
| 2,132,447 | 10/1938 | Stout | 250—223 X |
| 2,763,790 | 9/1956 | Ohmart | 250—43.5 |
| 2,964,628 | 12/1960 | Ohmart | 250—43.5 |
| 3,007,048 | 10/1961 | Knapp et al. | 250—43.5 |
| 3,043,956 | 7/1962 | Cohen | 250—43.5 X |

RALPH G. NILSON, *Primary Examiner.*

ARCHIE R. BORCHELT, *Examiners.*